US012755347B2

(12) United States Patent
Ventsch et al.

(10) Patent No.: US 12,755,347 B2
(45) Date of Patent: Oct. 6, 2026

(54) METHOD FOR PROVIDING A THERMAL IMAGE OF A THERMAL IMAGING CAMERA WITH AN INCREASED RESOLUTION

(71) Applicant: Robert Bosch GmbH, Stuttgart (DE)

(72) Inventors: Nicole Ventsch, Stuttgart (DE); Andreas Frischen, Leonberg (DE); Axel Rumberg, Karlsruhe (DE); Ina Sophie Boettcher, Simmersfeld (DE); Michael Frank, Bretten (DE); Patrick Meyer, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/973,023

(22) Filed: Dec. 8, 2024

(65) Prior Publication Data

US 2025/0200713 A1 Jun. 19, 2025

(30) Foreign Application Priority Data

Dec. 14, 2023 (DE) ..................... 10 2023 212 664.8

(51) Int. Cl.
*G06T 5/50* (2006.01)
*G06T 3/4053* (2024.01)
(Continued)

(52) U.S. Cl.
CPC .............. *G06T 5/50* (2013.01); *G06T 3/4053* (2013.01); *G06T 7/20* (2013.01); *H04N 23/23* (2023.01);
(Continued)

(58) Field of Classification Search
CPC ....... G06T 3/4053; G06T 5/50; G06T 3/4076; G06T 2207/20221; G06T 3/4069;
(Continued)

(56) References Cited

U.S. PATENT DOCUMENTS

| | | | | |
|---|---|---|---|---|
| 11,551,345 B1 * | 1/2023 | Piety | ........................ | H04N 5/77 |
| 2009/0190851 A1 * | 7/2009 | Chien | ........................ | G06T 5/73<br>382/255 |

(Continued)

FOREIGN PATENT DOCUMENTS

| | | |
|---|---|---|
| CN | 106597921 A | 4/2017 |
| DE | 10 2011 103 766 A1 | 12/2012 |

(Continued)

OTHER PUBLICATIONS

Nasrollahi et al., "Super-Resolution: a Comprehensive Survey", Machine Vision and Applications, Jun. 14, 2014, vol. 25, Springer (46 Pages), DOI 10.1007/s00138-014-0623-4.

*Primary Examiner* — Masum Billah
(74) *Attorney, Agent, or Firm* — Maginot, Moore & Beck LLP

(57) ABSTRACT

A method for providing a thermal image of a thermal imaging camera with an increased resolution, includes (i) initiating a vibration by a vibratory motor of the thermal imaging camera to provide movement during capturing of image data by the thermal imaging camera, (ii) initiating the capturing of image data by the thermal imaging camera during the vibration, wherein the image data comprises at least two thermal images, and (iii) determining the thermal image based on a method for increasing a resolution of the thermal image. A computer program, a device, and a storage medium for this purpose is also disclosed.

9 Claims, 2 Drawing Sheets

(51) Int. Cl.
*G06T 7/20* (2017.01)
*H04N 23/23* (2023.01)

(52) U.S. Cl.
CPC ............... *G06T 2207/10048* (2013.01); *G06T 2207/20221* (2013.01)

(58) Field of Classification Search
CPC ............. G06T 5/73; G06T 2207/10048; G06T 2207/10024; G06T 7/13; G06T 3/40
USPC .......................................................... 348/164
See application file for complete search history.

(56) References Cited

U.S. PATENT DOCUMENTS

| | | | |
|---|---|---|---|
| 2011/0169960 | A1 | 7/2011 | Wagner |
| 2013/0321638 | A1 | 12/2013 | Stratmann et al. |

FOREIGN PATENT DOCUMENTS

| | | | | | |
|---|---|---|---|---|---|
| DE | 10 2011 121 334 | A1 | | 6/2013 | |
| DE | 102011121334 | B4 | * | 8/2016 | ........... H04N 23/951 |
| KR | 2000-0013370 | A | | 3/2000 | |

* cited by examiner

METHOD FOR PROVIDING A THERMAL IMAGE OF A THERMAL IMAGING CAMERA WITH AN INCREASED RESOLUTION

This application claims priority under 35 U.S.C. § 119 to patent application no. DE 10 2023 212 664.8, filed on Dec. 14, 2023 in Germany, the disclosure of which is incorporated herein by reference in its entirety.

The disclosure relates to a method for providing a thermal image of a thermal imaging camera with an increased resolution. The disclosure further relates to a computer program, a device, and a storage medium for this purpose.

BACKGROUND

A main argument impacting the decision to purchase a thermal imaging camera is the resolution of the thermal image. The higher the resolution, the more details can be seen and the more use cases can be handled with the camera. The resolution is thus an important feature of high-quality thermal imaging cameras. However, since resolution depends directly on the quality and thus the price of the infrared sensors used, a higher sensor resolution automatically also means a higher price for the components. Alternatively, algorithms may be used to improve image quality as a way to improve resolution without more expensive components. Super-resolution algorithms are used to improve resolution, for example. Both classic algorithms, meaning algorithms based on classical image processing, and algorithms based on machine learning can be used for this purpose.

The use of super-resolution algorithms is in particular based on subpixel shifts between a sequence of images. If, however, there is no or only a slight shift between the images, the approach will only function in a limited way or will not function at all.

SUMMARY

The subject matter of the disclosure is a method, a computer program, a device, and a computer-readable storage medium having the features set forth below. Further features and details of the disclosure will emerge from the description and the drawings. Features and details which are described in connection with the method according to the disclosure naturally also apply in connection with the computer program according to the disclosure, the device according to the disclosure, and the computer-readable storage medium according to the disclosure, and vice versa in each case, so that reference is always or can always be made to the individual aspects of the disclosure with respect to the disclosure.

The subject matter of the disclosure is in particular a procedure for using a method for increasing a resolution of an image of a thermal imaging camera comprising the following steps, wherein the steps can be carried out repeatedly and/or sequentially. Increasing the resolution is in particular a technical process in which the number of pixels in the image of the thermal imaging camera is increased in order to improve a detail and sharpness of the image perceived by a user. This may be accomplished in a variety of ways, for example by interpolation, wherein new pixels are inserted between the existing pixels of the image. Further, super-resolution algorithms may be employed, which are a specialized form of image resolution enhancement. In particular, missing details are reconstructed in low-resolution images in such enhancements. Super-resolution algorithms can often provide more detailed and clear results than simple interpolation. The thermal imaging camera is preferably a handheld thermal imaging camera, i.e. a thermal imaging camera, which can be held and operated by a user.

In a first step, vibration is preferably initiated by a vibratory motor of the thermal camera to provide motion during capturing of image data by the thermal imaging camera. The movement is thus provided by the vibration of the vibratory motor of the thermal imaging camera.

In a further step, the capturing of image data by the thermal imaging camera is preferably initiated during the vibration, wherein the image data comprises at least two thermal images. The thermal images are in particular infrared images and may be captured by an infrared camera sensor of the thermal imaging camera. The image data may further comprise regular camera images, which may also be referred to as visual images. The regular camera images may represent a light spectrum visible to a human and may be captured by a corresponding camera sensor of the thermal imaging camera.

In a further step, preferably the thermal image is determined based on a method for increasing a resolution of the thermal image. Various methods known in the prior art, for example an interpolation or a super-resolution, can be carried out for this purpose.

Various methods for increasing the resolution may only work to a limited extent if there is too little movement present, even leading to a degraded result when compared to the input images. Due to the movement provided by the vibratory motor, it may be advantageously ensured that the movement is sufficiently great for the method for increasing the resolution.

Preferably, it may be contemplated within the scope of the disclosure that, as part of the determination, the method for increasing the resolution comprises the following steps, wherein the steps are preferably carried out one after the other. In a first step, preferably a subpixel shift is determined for individual images of the image data compared to a reference image, wherein the reference image is one of the individual images of the image data. In this step, in particular for each image of the individual images, a shift on the subpixel level is determined relative to the selected reference image, for example by determining an optical flow. For example, the selected reference image may be the image of the individual images which was taken last. This shift is in particular necessary to compensate for differences in the camera position or perspective between the images. Accuracy at the subpixel level advantageously allows for more precise alignment, which can increase the quality of the resulting image. The subpixel shift may be caused or amplified by the vibratory motor.

In a further step, preferably the individual images are shifted based on the determined subpixel shift so that they are aligned with the reference image. After the subpixel shift has been determined for each of the individual images, the images can be shifted accordingly to align with the reference image. This alignment can advantageously ensure that corresponding points match in all images, which is in particular necessary for a subsequent fusion of the images.

In a further step, preferably the individual images are scaled by a defined scaling factor. For example, a four-fold scaling, i.e. a defined scaling factor of four, may be provided. This may be done for various reasons, such as adjusting the images to a particular target resolution or standardizing the image sizes to improve alignment and/or reduce computational load during subsequent image fusion. As part of the scaling, each of the individual images may be interpolated.

In a further step, preferably a resulting image is determined based on the scaled individual images and the determined subpixel shift. This step may also be understood as a fusion of the images to the resulting image. In the last step in particular, therefore, the final high-resolution image is generated by combining the previously scaled and aligned images with one another. Information from all individual images is preferably integrated during this process, taking into account their respective subpixel shifts. This integration may advantageously lead to the creation of a more detailed and sharper image, which can significantly improve the resolution and quality compared the individual starting images.

The method for increasing resolution is preferably a super-resolution algorithm, in particular a multi-image super-resolution algorithm.

According to an advantageous further development of the disclosure, it can be provided that the image data comprises both regular camera images and thermal images, wherein the regular camera images and the thermal images are captured in parallel by the thermal imaging camera. The regular camera images are in particular images that lie in a light spectrum visible to a human. Thus, the thermal imaging camera may comprise a camera sensor for capturing the regular camera images and a thermal imaging camera sensor, or infra-red camera sensor, for capturing the thermal images. The parallel capturing may express that a respective pair of images is simultaneously captured, consisting of a regular camera image and a thermal image, wherein a time tolerance between the two captures may be accepted. A link between the regular camera image and the thermal image captured in parallel can thus be advantageously created.

The step of determining the subpixel shift may then be carried out based on the regular camera images, in order to carry out the shifting, the scaling, and the determination of the resulting image based on the thermal images and the subpixel shift determined based on the regular images. A higher resolution and/or a higher detectable level of detail may be present in the regular camera images, which may advantageously make a more precise determination of the subpixel shift possible. Alternatively or additionally, the steps of determining the subpixel shift, shifting, scaling, and determining the resulting image may be carried out based on the thermal images. Thus, advantageously, the method for increasing the resolution can be carried out independent of the regular camera images. It can also be provided that the subpixel shift is determined based on both the regular camera images and the thermal images in order to be able to advantageously compare the respective determined subpixel shifts, for example to detect errors.

The disclosure may provide that the method further comprises the following step:

initiating a display of the resulting thermal image.

The thermal imaging camera may comprise a display on which the resulting thermal image is displayed. A transfer of the resulting thermal image to a further data processing device on which the resulting thermal image is to be displayed is also contemplated.

It may be advantageous if the disclosure provides that the method further comprises the following step:

configuring a vibration frequency, a vibration duration, and a vibration amplitude.

A value or range of values for vibration frequency, vibration amplitude, and vibration duration that satisfies the requirement for sufficient movement for the method to increase the resolution may be individually determined for such a thermal imaging camera. For example, corresponding minimum vibration frequency and/or vibration duration and/or vibration amplitude values could be predetermined for certain models of thermal imaging cameras. It is also contemplated that in certain scenarios, increasing the vibration frequency and/or the vibration duration and/or the vibration amplitude may lead to better results when using the method to increase the resolution. Accordingly, the vibration frequency and/or vibration duration and/or vibration amplitude could be varied.

Also, it is optionally contemplated that the vibration could be initiated as a function of a triggering condition, wherein the triggering condition is a determined movement represented in the image data. The movement may be determined by detecting a respective object based on object detection and/or classification and comparing the respective location of the detected object between the individual images of the image data. Segmentation algorithms or machine learning-based detection or classification methods may be employed for object detection and/or classification, for example. Another possible triggering condition would be a command such as actuation of a corresponding button on the thermal imaging camera by a user.

In addition, the disclosure may advantageously provide that the method further comprises the following step:

analyzing a movement in the captured image data, wherein the movement is represented by a shift of pixel values in the image data, With the analysis of the displacement of pixel values in the image data, it is possible to advantageously simultaneously take into consideration the movement in the scene captured by the thermal imaging camera as well as the movement of the thermal imaging camera itself. The determination may then be carried out depending on a result of the analysis. By this approach, it may be advantageously provided that if there is too little movement in the image data the vibratory motor may be used, or if there is too much movement in the image data, the use of the vibratory motor may be subsequently prevented.

Another object of the disclosure is a computer program, in particular a computer program product, comprising instructions which, when the computer program is executed by a computer, cause the computer to carry out the method according to the disclosure. The computer program according to the disclosure thus brings with it the same advantages as have been described in detail with reference to a method according to the disclosure.

The disclosure also relates to a device for data processing which is configured to carry out the method according to the disclosure. The device can be a computer, for example, that executes the computer program according to the disclosure. The computer can comprise at least one processor for executing the computer program. A non-volatile data memory can be provided as well, in which the computer program can be stored and from which the computer program can be read by the processor for execution.

The disclosure can also relate to a computer-readable storage medium, which comprises the computer program according to the disclosure and/or instructions that, when executed by a computer, prompt said computer program to carry out the method according to the disclosure. The storage medium is configured as a data memory such as a hard drive and/or a non-volatile memory and/or a memory card, for example. The storage medium can, for example, be integrated into the computer.

In addition, the method according to the disclosure can also be designed as a computer-implemented method.

BRIEF DESCRIPTION OF THE DRAWINGS

Further advantages, features, and details of the disclosure emerge from the following description, in which exemplary embodiments of the disclosure are described in detail with reference to the drawings. The features mentioned in the claims and in the description can each be essential to the disclosure individually or in any combination. The figures show:

DETAILED DESCRIPTION

Figure 1:
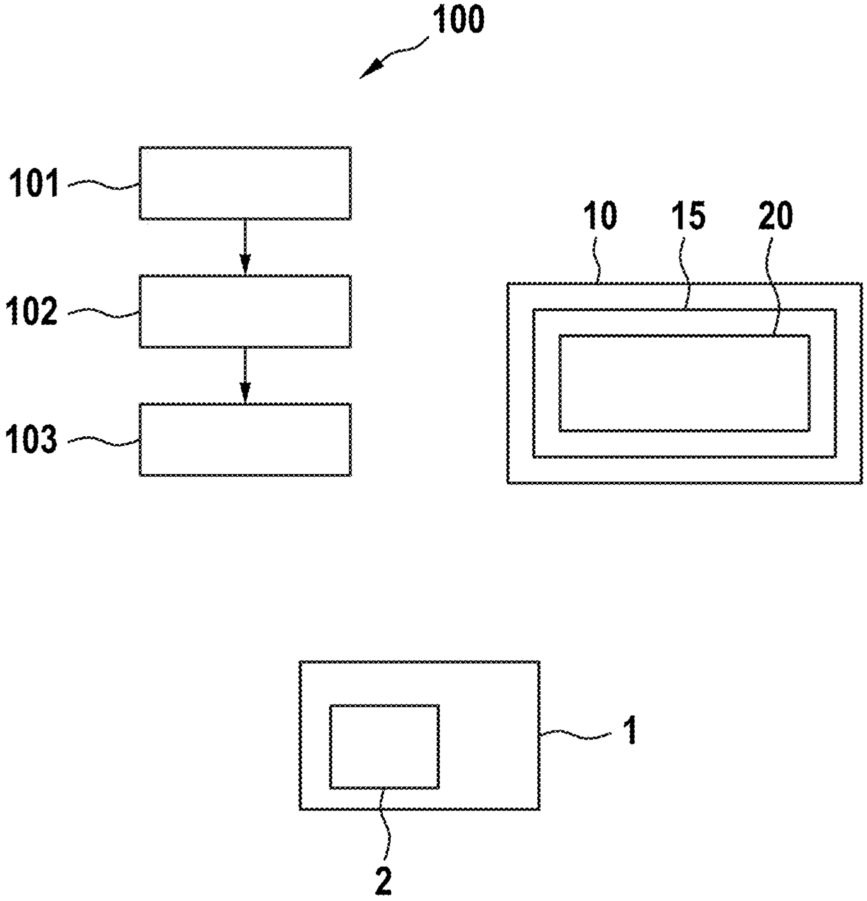
FIG. 1 a schematic visualization of a method, a thermal imaging camera with a vibratory motor, a device, a storage medium, and a computer program according to exemplary embodiments of the disclosure, FIG. 2 a schematic illustration of a method according to exemplary embodiments of the disclosure.

FIG. 1 schematically illustrates a method 100, a thermal imaging camera 1 with a vibratory motor 2, a device 10, a storage medium 15, and a computer program 20 according to exemplary embodiments of the disclosure.

In particular, FIG. 1 shows an exemplary embodiment for a method 100 to provide a thermal image of a thermal imaging camera 1 with an increased resolution. In a first step 101, vibration is initiated by a vibratory motor 2 of the thermal imaging camera 1 to provide movement during capturing of image data by the thermal imaging camera 1. In a second step 102, the capturing of image data is initiated by the thermal imaging camera 1 during the vibration, wherein the image data comprises at least two thermal images. In a third step 103, the thermal image is determined based on a method for increasing a resolution of the thermal image.

Super-resolution is a possible method for increasing the resolution of images that can be used in thermal imaging cameras 1. One idea is that, preferably, several images are taken rapidly in a row and combined to form a higher resolution image. This is done in two steps, for example, wherein any number N of images can be taken into consideration. In a first step, for example, the N images are registered using their optical flow relative to a reference image to determine how they are shifted from each other. In a second step, the registered images are particularly fused to a new, higher-resolution image. The visual image can be used for determining the subpixel shifts, i.e. the optical flow, because it has a higher resolution and thus more accurate shifts can be determined. In the context of the present disclosure, a visual image is in particular an image that is captured by a regular camera and represents a light spectrum visible to a human. However, the fusion must be carried out in particular based on the thermal images, as they are to be improved.

The first step of the is thus carried out in particular via the determination of the optical flow and the second via iterative methods, for example using classical image processing methods. Alternatively, however, machine learning-based methods can also be used that solve these steps using machine learning models, in particular neural networks.

With the present disclosure, according to exemplary embodiments, motion in image data can be artificially generated by the use of a vibratory motor 2. One aspect of the present disclosure is thus in particular an application of a method for increasing a resolution of a thermal image, for example super-resolution in thermal imaging cameras 1 using a vibratory motor 2.

First, preferably a sequence of images, i.e. a defined number, for example three images, is taken into consideration. Subsequently, a shift of the images relative to each other may be determined in order to map the images to one other. Then, the registered images are preferably fused to a single image with better resolution. An example of such an algorithm would be the Multi-Memory Convolutional Network for Video Super-Resolution (MMCNN) algorithm, but other machine learning models with the same blocks, i.e., image registration and subsequent image fusion, may also be used.

Alternatively, the algorithm may also be created from two individual machine learning models, in particular neural networks, i.e. one for image registration and one for image fusion. The visual image could also be used for more accurate image registration due to the higher resolution of the visual image compared to the thermal image, and the thermal image could be used for the fusion, as this should preferably improve it. The machine learning models that are used are preferably already trained so that they can be used without major changes and can at most be retrained to improve their performance.

However, even with these algorithms, regardless of which specific one is used, certain prerequisites must preferably be given in order to achieve a high-quality result. A basic requirement is, for example, a movement, i.e. the existence of subpixel shifts between the images. Thus, according to exemplary embodiments, this disclosure relates to a use of a vibratory motor 2 to provide the movement, or these shifts, respectively.

Figure 2:
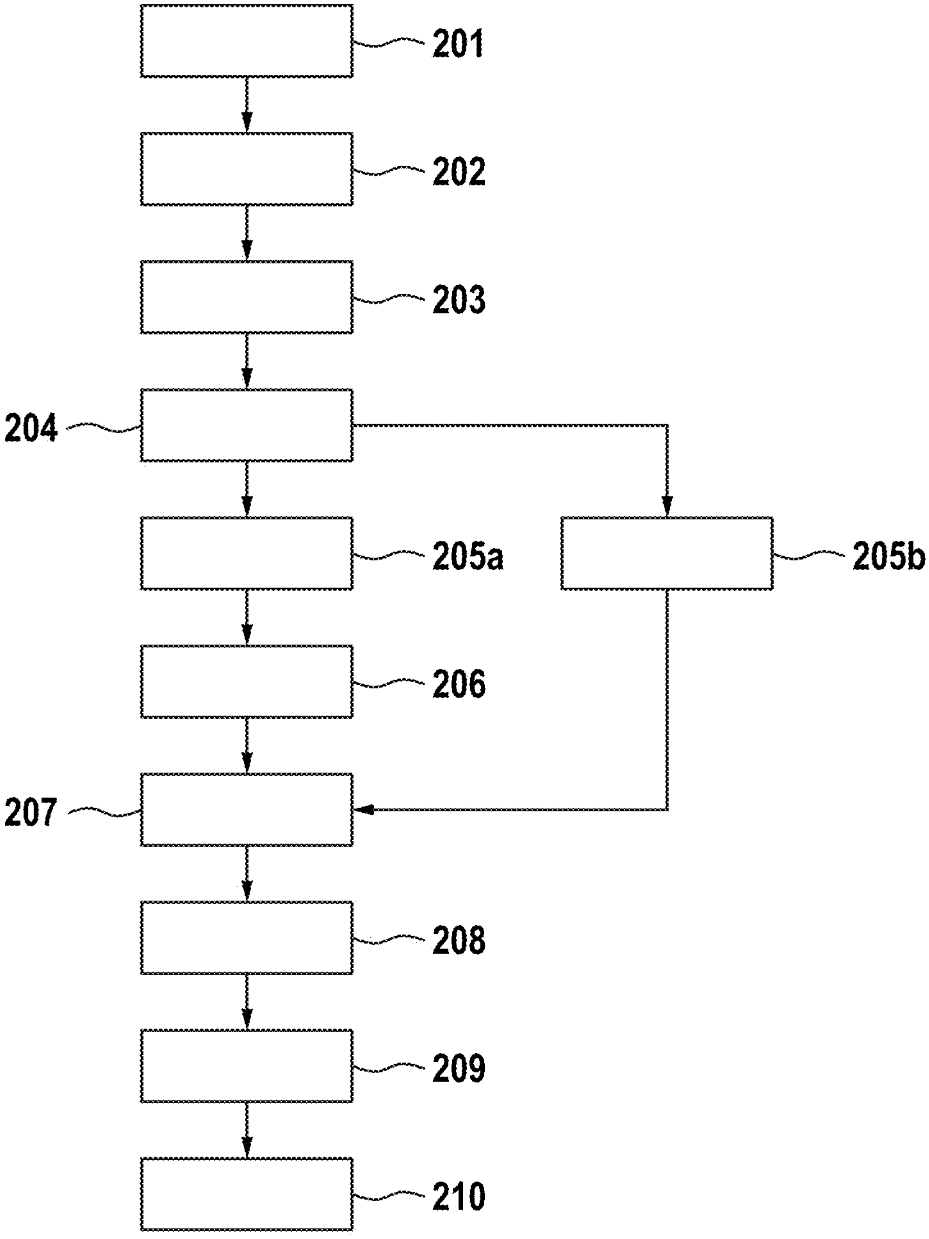

If a thermal image is to be improved based on a method for increasing the resolution, for example super-resolution, the method may be carried out according to the exemplary embodiment shown in FIG. 2. Here, either the visual images, i.e. images captured by a regular camera sensor, or thermal images, i.e. images captured by a thermal imaging or infrared camera sensor are used for the image registration. According to the exemplary embodiment in FIG. 2, there are thus two possible approaches depending on which images are used for the image registration. This could be decided in a practical application, for example before activating the method according to exemplary embodiments. For example, the method may be implemented by a corresponding algorithm in the thermal imaging camera 1.

If the method for increasing the resolution is activated according to step 201, preferably a vibratory motor 2 is activated according to step 202. Now, while the vibratory motor 2 is activated, a sequence of thermal and (if needed) visual images is captured according to step 203. A frequency and/or vibration amplitude of the vibratory motor 2 may be adjusted to take sharp photographs despite the motion provided. The vibratory motor 2 is then preferably deactivated again according to step 204. A distinction can now be made depending on whether or not visual images are to be used for the image registration. If so, the optical flow is preferably determined according to step 205*a* for the visual images to obtain the subpixel shift to a reference image (e.g., the latest image used). This subpixel shift may then be transferred to the thermal images according to step 206. According to step 207, these are subsequently shifted, in particular by whole pixels, so that the image content is superimposed as far as possible. Then, the thermal images are preferably scaled or interpolated according to step 208 to a multiple of the original size (e.g., four-fold) and interpolated, taking into account the determined subpixel shift to obtain a highly scaled thermal image based on a fusion of the scaled images according to step 209. This may then be displayed on a display of the thermal imaging camera 1 according to step 210.

If the visual images are not to be used for the image registration, the optical flow for the thermal images is determined according to step 205*b* preferably after the vibratory motor 2 is turned off, so that the subpixel shift of the thermal images relative to a reference image results from the sequence. The thermal images can then be shifted according to step 207 by whole pixels in such a way that the content of the image is superimposed as far as possible. Finally, the thermal images are preferably scaled or interpolated according to step 208 to a multiple of the original size (e.g., four-fold) and fused according to step 209, taking into account the determined subpixel shift, to obtain a highly scaled thermal image. This may then be displayed on a display of the thermal imaging camera 1 according to step 210.

The method for increasing the resolution, in particular the super-resolution algorithm, can be used both when saving the images or in a computer or smartphone app for post-processing. The vibratory motor 2 for generating movement with subsequent capturing of a sequence of images can be disposed and used in the thermal imaging camera 1.

The above explanation of the embodiments describes the present disclosure solely within the scope of examples. Of course, individual features of the embodiments may be freely combined with one another, if technically feasible, without leaving the scope of the present disclosure.

What is claimed is:

1. A method for providing a thermal image using a thermal imaging camera, comprising:

initiating a vibration by a vibratory motor of the thermal imaging camera to provide movement during capturing of image data by the thermal imaging camera;

initiating the capturing of the image data by the thermal imaging camera during the vibration, wherein the image data comprises at least two initial thermal images and at least two regular camera images; and determining the thermal image based on the at least two initial thermal images and the at least two regular camera images, the thermal image having a higher resolution than a resolution of the at least two initial thermal images, wherein the at least two regular camera images and the at least two initial thermal images are captured in parallel by the thermal imaging camera, wherein the thermal image has an increased resolution by (i) determining a subpixel shift of individual images of the image data compared to a reference image of the image data, wherein the reference image is one of the individual images of the image data, (ii) shifting the individual images of the image data based on the subpixel shift to align with the reference image, (iii) scaling the individual images of the image data by a defined scaling factor, and (iv) determining the thermal image based on the scaled individual images of the image data and the subpixel shift, and wherein the shifting and the scaling are performed based on the at least two regular camera images.

2. The method according to claim 1, wherein determining the shifting and the scaling are further performed based on the at least two initial thermal images.

3. The method according to claim 1, further comprising:

displaying the thermal image on a display unit of the thermal imaging camera.

4. The method according to claim 1, further comprising:

configuring a vibration frequency, a vibration duration, and/or a vibration amplitude of the vibration by the vibratory motor.

5. The method according to claim 1, wherein:

the initiating of the vibration is carried out depending on a triggering condition, and the triggering condition is a determined movement represented in the image data.

6. The method according to claim 1, further comprising:

analyzing a movement in the image data, wherein the movement is represented by a shift of pixel values in the image data, and wherein the thermal image is determined based on the analysis of the movement.

7. The method according to claim 1, wherein a computer program comprises instructions for causing a computer to carry out the method when the computer program is executed by the computer.

8. A device for data processing which is configured to carry out the method according to claim 1.

9. A non-transitory computer-readable storage medium, comprising instructions which, when executed by a computer, cause the computer to carry out the method according to claim 1.

* * * * *